Figure 1:
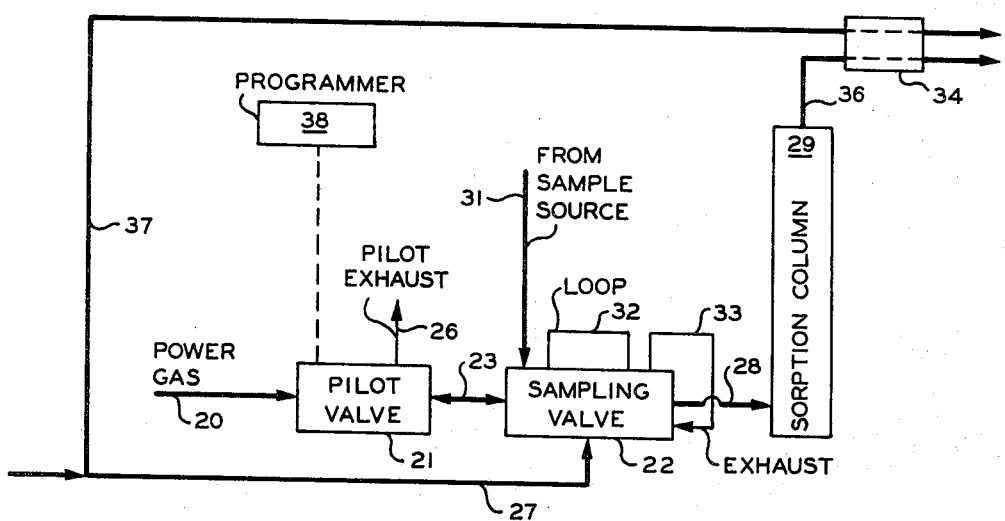

Dec. 24, 1968  W. C. HAHN  3,417,605
VALVE SAMPLING SYSTEM FOR TAKING GASEOUS SAMPLES
AT ABOUT ATMOSPHERIC PRESSURE
Filed Oct. 17, 1966  3 Sheets-Sheet 1

INVENTOR.
W. C. HAHN
BY Young & Quigg
ATTORNEYS

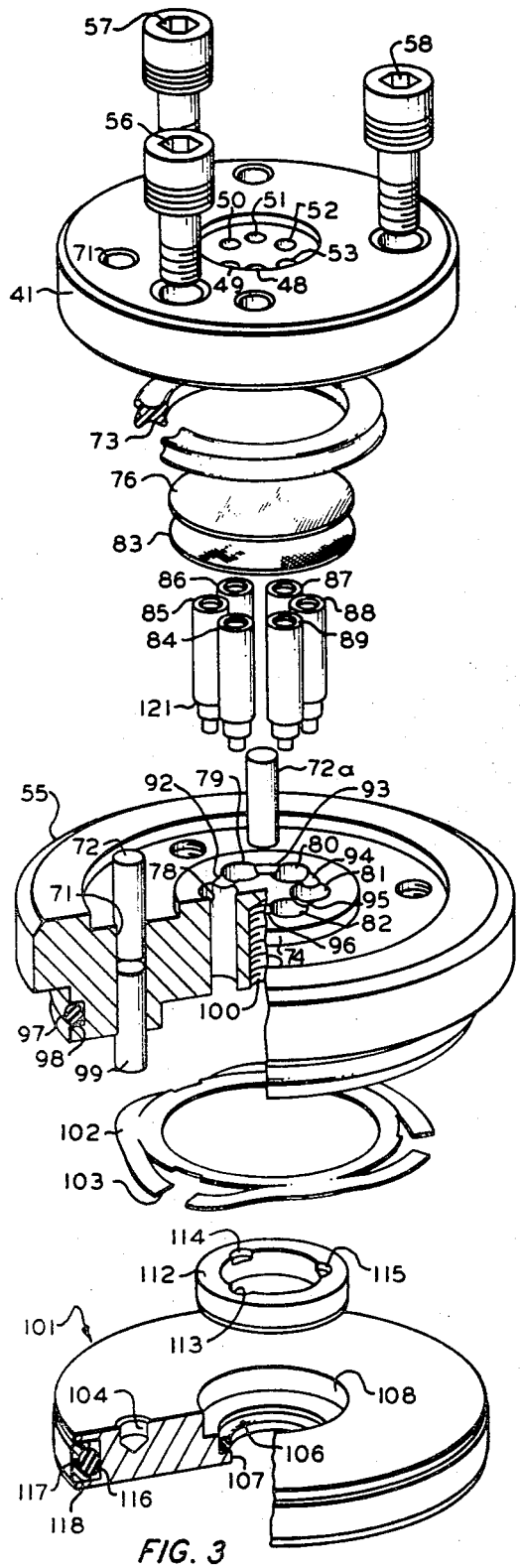
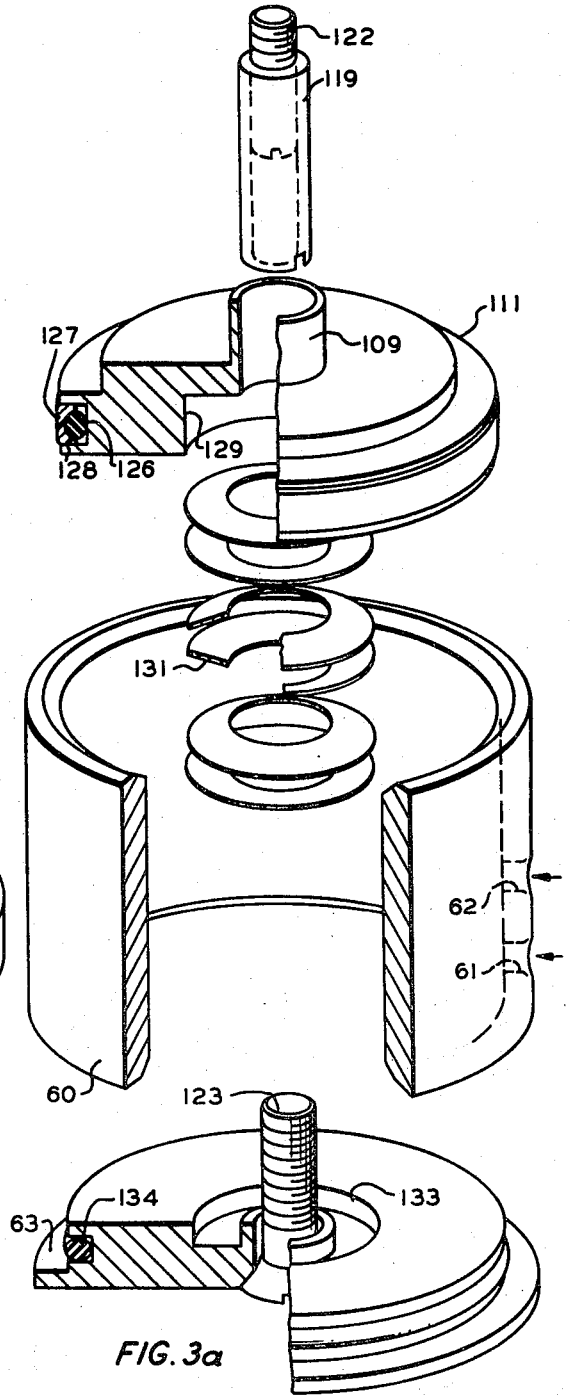
FIG. 3
FIG. 3a
INVENTOR.
W. C. HAHN
BY Young & Quigg
ATTORNEYS United States Patent Office 3,417,605
Patented Dec. 24, 1968

3,417,605
VALVE SAMPLING SYSTEM FOR TAKING GASEOUS SAMPLES AT ABOUT ATMOSPHERIC PRESSURE
William C. Hahn, Bartlesville, Okla., assignor to Phillips Petroleum Company, a corporation of Delaware
Filed Oct. 17, 1966, Ser. No. 587,081
5 Claims. (Cl. 73—23)

This invention relates to a multi-port, diaphragm-sealed, valve mechanism. In another aspect it relates to a fluid-actuated, multi piston-operated, sampling valve for a chromatographic analyzer having a built-in means for selecting a sample at about atmospheric pressure without an external means for forcing the sample into the sampling valve.

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity, and simplicity of operation make this type of analyzer very attractive for use in automatic process control.

U.S. 3,140,615, Arthur B. Broerman, incorporated herein by reference, discloses and claims a sampling valve which overcomes many problems inherent in chromatographic analyzers. It has been proposed to use the valve of 3,140,615 for obtaining samples for detecting minute quantities of gases within the atmosphere or within the containers in which the gas is at atmospheric pressure. For example, the valve could be used to obtain samples of the atmosphere for smog detection. Also, the valve could be used as a bottle sniffer to obtain samples of gases in reusable bottles wherein the pressure of the deleterious gases within the bottles can make the bottle unsuitable for reuse.

One problem in obtaining samples at atmospheric pressure is that there must be some means to force a sample into the analyzer since both sample and sample loop are at atmospheric pressure. A way to overcome this problem would be to attach a vacuum source to the sample exhaust to thereby draw the sample through the sample loop within the valve. However, a vacuum pump is expensive and bulky and would militate against the mobile use of this valve. I have now discovered that the valve of U.S. 3,140,615 can be adapted for sampling atmospheric air mixtures or other gas mixtures at atmospheric pressure or below without elaborate means for drawing the sample into the sample loop, by attaching the sample exhaust to a weep hole connected to an internal chamber which expands and contracts with the operation of the valve, the expansion contraction of the chamber serving to draw sample into the sample loop and purge the unused sample back through the sample inlet conduit.

By various aspects of this invention, one or more of the following, or other, objects can be obtained.

It is an object of this invention to provide a sampling valve for selecting a sample useful for detecting minute quantities of gases or liquids which are in an atmospheric pressure environment.

It is a further object of this invention to provide a sampling valve for use in detecting the presence of smog creating gases in the atmosphere.

It is a further object of this invention to provide a sampling valve for use in detecting the presence of deleterious hydrocarbonaceous substances in reuseable bottles.

It is a still further object of this invention to provide a system for determining the value of a bottle for reuse.

Other aspects, objects, and the several advantages of this invention are apparent to one skilled in the art from a study of this disclosure, the drawings, and the appended claims.

Figure 2:
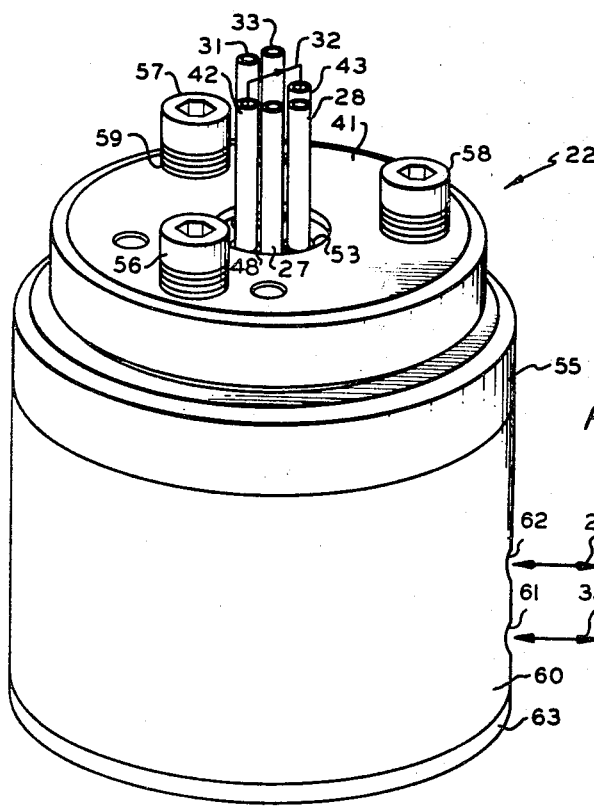
Figure 4:
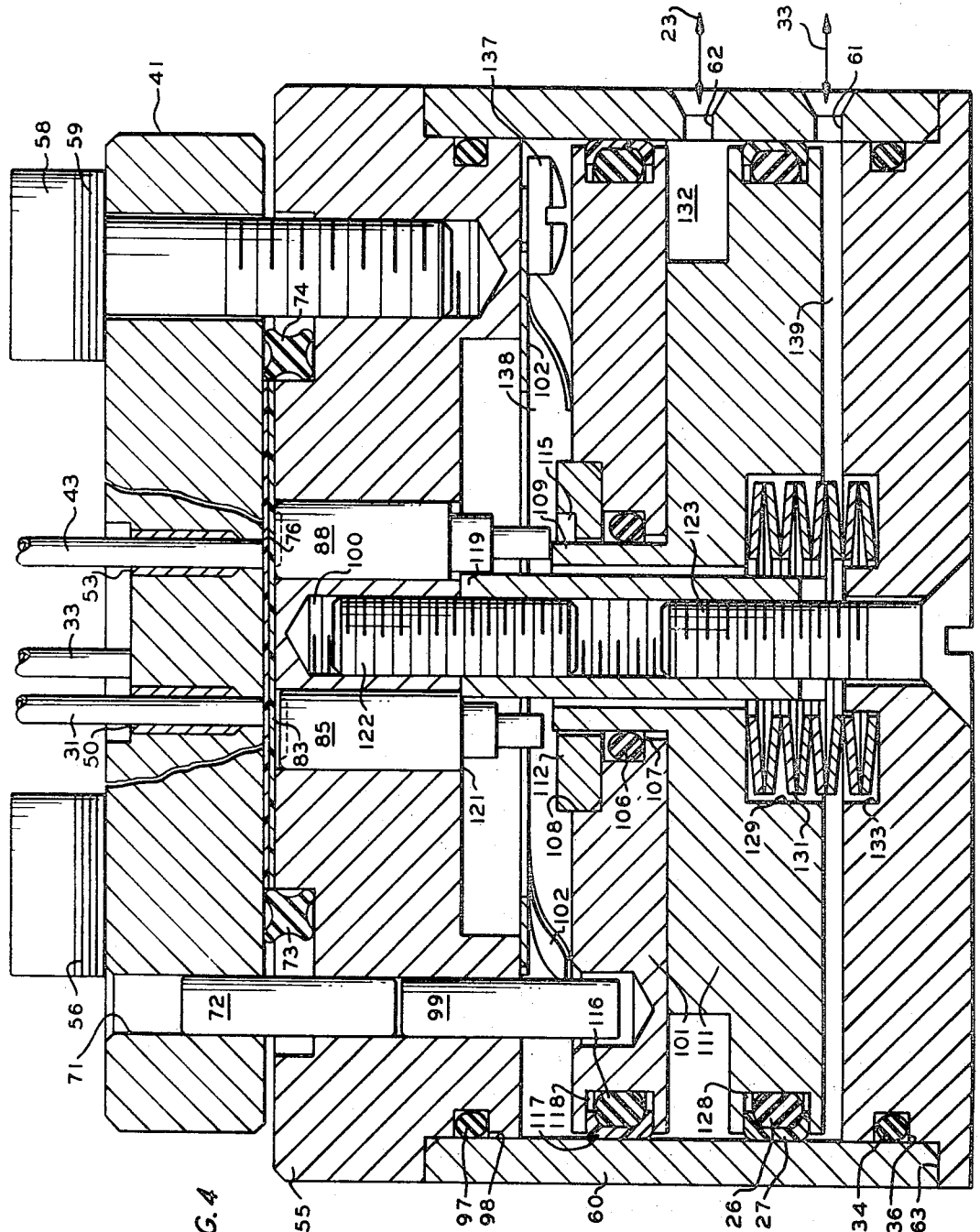

The invention will now be described with reference to the accompanying drawings in which FIGURE 1 is a schematic flow diagram of a chromatographic analyzer system embodying the sampling valve of this invention; FIGURE 2 is a perspective view of an assembled fluid-actuated, diaphragm-sealed valve which can be used in this invention; FIGURES 3 and 3a are exploded perspective views of the components of the diaphragm valve shown in FIGURE 2; and FIGURE 4 is a full sectional view of the assembled valve shown in FIGURES 2, 3 and 3a.

Reference is now made to FIGURE 1 in particular, wherein a power gas, such as air, passes via conduit 20 to pilot valve 21, wherein the power gas stream is directed to a first chamber (not shown) of a pneumatically-actuated, diaphragm-sealed sampling valve 22 via conduit 23. Alternately, the sampling valve 22 is vented via conduit 23, pilot valve 21, and pilot exhaust conduit 26. A carrier gas, such as helium or hydrogen, is passed via conduit 27, sampling valve 22, and conduit 28 to column 29. A sample source (not shown) is connected to sampling valve 22 via conduit 31, being circulated through sample loop 32 of sampling valve 22, and vented therefrom via sample exhaust conduit 33 which, according to the invention, is connected to a second chamber (not shown) of sampling valve 22. Periodically, the sample in loop 32 is passed along with the carrier gas, via conduit 28, to sorption column 29, where constitutents of the sample are absorbed or adsorbed, depending upon the nature of the contact material, and then are selectively desorbed by a continuing flow of carrier gas therethrough to be identified and measured. The sampling valve system of the invention need not be used in combination with a sorption column but the sample can be passed directly to a sensitive detector such as an ionization detector.

The effluent from the sorption column 29 passes through an analyzer, indicated as thermal conductivity assembly 34, via conduit 36. The output signal from the detector 34 is passed to a recording instrument (not shown), which can be a conventional strip chart recorder. A stream of carrier gas is passed via conduit 37 from conduit 27 directly to the reference cell of detector 34, so as to balance out the effect of the carrier gas in the column 29 effluent. The sample gas to be analyzed generally enters the system periodically through conduit 31. It is drawn into conduit 33 when a slug thereof is selected for analysis. Pilot valve 21 is actuated by programmer 38, which can be operated by a time cycle or other means. For a detailed discussion of the design and manner of operation of a typical pilot valve which can be used in conjunction with this invention, see the Model 3C1 Air Switch of the Compressed Air Service Company, Dayton, Ohio, described in detail in Bulletin 20.

When pilot valve 21 is changed from the first described position, power gas is exhausted from sampling valve 22 via conduit 23. A sample in then drawn into the sample loop via conduit 31. When power gas is supplied to sample valve 22, the sample is trapped within sample loop 32 and carrier gas passes to sample loop 32 and carries the sample to sorption column 29 or to a suitable detecting means.

In FIGURE 2, there is shown a perspective view of the assembled fluid-actuated flexible diaphragm sampling valve of this invention, generally designated 22. Sampling valve 22 comprises an upper cap 41 provided with six small diameter conduits 27, 28, 31, 33, 42 and 43, which communicate directly with the lower surface of upper block 41 by spaced vertical passages, such as 48. Sample loop 32 communicates between conduits 42 and 43. Conduit 42, for example, is press fitted into spaced passage 48, thereby effecting a seal. Silver brazing gives mechanical strength to the press fit to prevent twisting the conduit and breaking the seal. Adjacent to upper block is intermediate block 55 provided with a plurality of cylindrical passages (not seen) communicating between the upper and lower faces thereof. Allen headed cap screws 56 to 58 secure cap 41 to intermediate block 55, which is spaced therefrom by a flexible sealing diaphragm and cushion (not seen). Plural Belleville washers, such as 59, are positioned on the shaft of the cap screws. Washers 59 permit tightening down cap 41 evenly. This is due to the feel of slowly increasing torque as turning of cap screws 56 to 58 exerts downward pressure on cap 41, gradually compressing the washers flat. There is an abrupt change in the torque as the washers flatten, indicating that further capscrew tightening would damage diaphragm and/or cap. In the prior art method, it is most difficult to tighten the cap without mashing one side of the thin diaphragm, or distorting the cap due to bending.

Disposed adjacent and supporting body 55 is a cylindrical casing or sleeve 60, provided with threaded passages 61 and 62. Passage 62 communicates with an internal annular chamber (not shown) disposed within casing 60. Passage 61 communicates with another internal chamber (not shown) disposed beneath the chamber which communicates with passage 62 and separated from that chamber by a power piston as will be hereinafter described. Disposed adjacent and below casing 60 is a third body 63 serving as a closure plate and forming the base of valve 22.

Referring now to FIGURES 3 and 3a, showing an exploded view of the sampling valve, cap 41 is provided with one or more vertical passages, such as 71 and 71a which accommodate cap key pins, such as 72 and 72a, that align cap 41 properly relative to body 55. A resilient quadring 73, of generally square cross-section, with concave sides, is disposed between cap 41 and body 55. Ring 73 is preferably composed of an elastomeric material which is chemically inert and heat resistant, such as silicone rubber, and seats on shoulder 74 of body 55 beneath cap 41.

A flexible sealing diaphragm 76, of a diameter about that of the inner diameter of raised portion 74, and at least sufficient to cover vertical passages 77 to 82, is disposed above body 55. Sealing diaphragm 76 is preferably composed of a thermosetting plastic which is chemically inert and heat resistant, such as Teflon (a polymer of tetrafluoroethylene).

Disposed between diaphragm 76 and body 55 is a cushion 83, which is suitably a 2 mil thick cloth of Dacron (a polyester fiber). It serves to prevent the Teflon sealing diaphragm from cold flowing, and also furnishes support for it to prevent ballooning under alternating carrier and power gas pressure, which results in an extended cycling life of the valve. Cushion 83 also serves to distribute pressure on the flexible diaphragm against the lower face of cap 41, thus evening out any variations in thickness of the diaphragm.

A set of metal plunger rods 84 to 89, are located within vertical passages 77 to 82, respectively, when the valve is assembled. These rods are machined to have a central relief in their upper end which provides an annular-shaped contact surface, that allows more sealing pressure per unit area to be exerted against the adjacent areas of cushion 83, as directed. Rods 85, 87 and 89 are 0.010 inch shorter than rods 84, 86 and 88.

Recesses 91 to 96, about 0.010–0.014 inch in depth, are provided within the circle described by passages 77 to 82, each recess communicating with the adjacent vertical passages. This type of communication between the vertical passages minimizes hang-up of sample fluid or carrier gas, and obviates excess pressure drop. (Recess 91 and passage 77 are not physical in FIGURE 3 due to the fact that they are included in that portion which has been cut away.)

A resilient O-ring 97, of generally circular cross-section, is disposed in a peripheral slot 98 in the lower portion of body 55. This ring makes an air-tight seal between body 55 and supporting casing 60. Extending from the lower end of passage 71 is another key pin 99, that aligns body 55 properly relative to air-loaded first power piston 101. A threaded vertical recess 100 is disposed central of body 55 from the lower face.

A crimped, metal retracting spring 102 machined from a spring steel stock is disposed between the lower surface of body 55 and the upper surface of piston 101. The cutouts, such as 103, are aligned to permit the passage of key pins, such as 99, therethrough to anchor in recess 104 of piston 101.

A resilient O-ring seal 106, of generally circular cross-section, is disposed on a shoulder 107 within a passage 108 central of piston 101. As assembled, ring 106, makes sealing contact with collar 109 of spring-loaded, second power piston 111. An annular-shaped member 112, serves as a retainer for ring 106, and as a push disc for short plunger rods 85, 87 and 89. Disc 112 is provided with three notched out recesses, 113 to 115, which are adjacent to the lower ends of long plunger rods 84, 86 and 88. These recesses serve as reliefs preventing contact between the rods and disc 112. The lower edge of disc 112 is beveled to aid seating body 101. Another O-ring 116 and a cap seal 117 comprising a thermosetting plastic, such as Teflon, are disposed in a slot 118 in the periphery of piston 101, permitting a sealing contact with the inner wall of casing 60.

An internally threaded cylindrical bushing 119 is provided, having a diameter so that it may pass slidably within collar 109. This upper end of this bushing provides a stop for all the plunger rods in their retracted position, by the contacting of shoulder 121 of rod 84, for example. Assembly screw 122 secures the upper portion of bushing 119 to a threaded recess (not shown) in the lower face of body 55. Another assembly screw 123 secures base 63 to the lower portion of bushing 119, permitting all components between body 55 and base 63 to be compressively tightened together.

An O-ring 126 and cap seal 127 are disposed in a slot 128 in the periphery of the piston 111, permitting a sealing contact with the inner wall of casing 60.

A recess 129 is provided in the lower face of piston 111, located central thereof, to accommodate Belleville washers, such as 131, which are grouped in opposing pairs to give the desired amount of upward bias to spring-loaded piston 111, this forces and maintains longer piston rods, like 89, closed, while no power gas pressure is in the annualr chamber 132 (see FIGURE 4) defined by pistons 101 and 111. Annular recess 133 in the upper face of base 63 provides a boss for washers 131. A resilient O-ring 134 is disposed in a peripheral slot 136 in base 63, permitting an air-tight seal between casing 60 and base 63.

In FIGURE 4, the assembled valve is shown in full section, except for the assembly screws, pins and plunger rods. A screw 137 is seen which retains retracting spring 102 fastened to the lower surface of body 55. Spring 102 is located in a chamber 138 defined by body 55 and air-loaded piston 111. Chamber 138 is in communication with the underside of cushion 83 via the working tolerances surrounding the plunger rods, such as 88. Chamber 138 is also in communication with chamber 139 via the tolerances between collar 109 and bushing 119. If desirable, an O-ring can be provided in the annular channel between collar 109 and bushing 119, and a vacuum can be drawn on chamber 138 as described and claimed in copending application Ser. No. 558,742 now Patent No. 3,387,496 to allow sampling of low pressure (below atmospheric) gas streams.

The volume of chamber 139 with or without chamber 138 is greater than the volume of line 31, sample loop 32 and line 33. Thus, each time power gas is supplied to chamber 132, the contraction of chambers 139 and 138 will cause gas to be exhausted from line 33 and line 31. When the gas is exhausted from chamber 132, the expansion of chambers 139 and 138 will draw a fresh sample into sample loop 32 via line 31.

In operation, in the absence of power gas flowing to chamber 132, the valve is in the unexcited, "fail safe" condition, preventing intermingling of sample fluid and carrier gas streams. In this at-rest position, depicted in FIGURE 4, spring washers 131 are exerting force on spring-loaded power piston 111, and through collar portion 109 thereof, holding adjacent long piston rods 84, 86 and 88 in sealing contact with adjacent portions of cushion 83 and sealing diaphragm 76, causing the latter to seal against the lower face of cap 41. Short plunger rods 85, 87 and 89, not being in contact with collar 109, rest on the upper end of bushing 119, the adjacent portions of cushion and diaphragm being relieved, allowing flow between adjacent vertical passages.

Now, carrier gas flowing continuously in conduit 27, under greater than ambient pressure, enters valve 22 via spaced passage 48, passing downwardly to lower face of cap 41, and over toward either spaced passage 49 or 53, depending upon whether piston rod 84 or 89 is in sealing contact with the diaphragm. Since in the unexcited position only longer rod 84 is in sealing contact, carrier gas flows from recess 96 across the top of vertical passage 82, under the diaphragm, over a recess 95 and into spaced passage 53, and out of valve 22, via conduit 28 to sorption column 29. Concurrently, a sample from a sample source can flow through conduit 31, entering valve 22 through spaced passage 50. Since longer rod 86 is in sealing contact with the diaphragm, sample fluid can flow from recess 12 across the top of vertical passage 78 under the diaphragm, over to recess 91 and into passage 49, and out of valve 22, via conduit 42, into sample loop 32. Sample fluid can re-enter valve 22 from loop 32 via conduit 43 and passage 52. Since longer rod 88 is in sealing contact with the diaphragm, sample can flow from recess 94 across the top of vertical passage 80, under the diaphragm, over to recess 93 and into spaced passage 51, and out of valve 22, via conduit 33.

When pilot valve 21 is switched to its alternate position, as determined by programmer 38, now power gas flows through conduit 23 to sampling valve 22, entering chamber 132 via passage 62. As the power gas pressure builds up in chamber 132, it exerts force on air-loaded power piston 101, first overcoming weak retracting spring 102 and contacting shorter piston rods 85, 87 and 89, raising them to make sealing contact with adjacent portions of cushion 83 and diaphragm 76, causing the latter to seal against the lower face of cap 41, thus shutting off sample and carrier gas flow through valve 22.

Subsequently, further pressure build-up in chamber 132 exerts sufficient force on spring-loaded power piston 111 to overcome stronger Belleville washers 131, allowing longer rods 84, 86 and 88 to retract into their vertical passages about .010 inch, by seating on the upper end of bushing 119. The notched recesses, such as 115, must be at least .020 inch deep, .010 inch of which is to allow short rods, such as 85, to rise into sealing position on power gas signal, and the other .010 each of which is to allow long rod, such as 88, to retract sufficiently open to allow flow across the vertical passage between the recesses adjacent the spaced passages.

This sequence is characterized as a "make seal before break seal" mode of operation, which prevents leakage of fluids from one path of flow to the alternate, as the paths of flow are being alternated.

Carrier gas from conduit 27 still enters valve 22 via passage 48, passing downwardly to the lower face of cap 41. Since in this excited position, shorter rod 89 is in sealing contact with the diaphragm, carrier gas flows from recess 96 across the top of vertical passage 77, under the diaphragm, over to recess 91 and into spaced passage 49, and thence to sample loop, driving the sample slug trapped therein before it. The carrier gas, with sample fluid entrained, re-enters valve 22 from loop 32 via conduit 43 and spaced passage 52. Since shorter rod 87 is in sealing contact with the diaphragm, sample flows from recess 94 across the top of vertical passage 81, under the diaphragm, over to recess 95 and into spaced passage 53, and out via conduit 28 to sorption column 29 for separation of the constituents in the sample slug in said column.

In this condition, shorter rod 85 is in sealing contact with the diaphragm. As the power gas is supplied, sample gas will be forced into valve 22 via conduit 33, into spaced passage 51, over recess 93, across vertical passage 79, into recess 92 and removed from valve 22 through passage 50. Since there is no pressure differential between lines 31 and 33, generally no sample will flow through sample valve 22 after the exhausting of the gas when the valve is in the excited condition.

When pilot valve 21 switches back to the non-excited position, power gas bleeds down through conduit 23, the power pistons return to their initially described position in reverse sequence and the two sets of piston rods also revert to the position shown in FIGURE 4. Thus, the paths of flow of sample and carrier gas will return to that initially described. The frequency with which the sample slug is passed to column 29 is determined by the operation of the pilot valve 21, controlled through programmer 38.

Whereas the invention has been described with reference to an external sample loop 32, it is within the scope of the invention to provide a sample loop within valve 22, for example, within body 41.

The device of the invention can be used for sampling atmospheric air for smog control or for the presence of other types of chemicals.

The device can also be used to "sniff" used milk bottles to see whether they are desirable for reuse. In this embodiment, the used and washed milk bottles can pass along a conveyor line and intermittently have line 31 stuck into each milk bottle. Before line 31 is put into the milk bottle, valve 22 should be in the excited position, i.e., with power gas supply to line 23. After line 31 is positioned within the bottle to be sampled, the power gas is exhausted from line 23 thereby drawing a sample into sample loop 32. The power gas is then applied again to allow a carrier gas passing through line 27 to push the sample trapped in sample loop 32 to a suitable detector. In the event that undesirable gases appear in the bottle, the bottle will be rejected from the line. The testing of milk bottles and the like is necessary when it is desirable to reuse them. It is known that bottles, especially plastic bottles, tend to absorb hydrocarbonaceous materials. Thus, if the bottle had been used to store hydrocarbon material before being returned, it would be unsuitable for reuse.

As a specific example of how the invention works, a sampling valve connected and operated in the manner described with relation to FIGURES 1–4 was used for sampling a gas stream which was under a pressure about that of atmospheric pressure. The volume of the cylinder of the valve was 2 cc. and the volume of the line 31, sample loop 32, and line 33 was 0.158 cc./ft., 0.079 cc. and .158 cc., respectively. As can be seen from these figures, line 31 can be up to 12 feet long. The valving arrangement was used for detecting the presence of hydrocarbons in reusable plastic containers. As the containers were fed along a conveyor system, a sample would be taken and passed to a detector. Responsive to whether or not hydrocarbons were detected, the container was passed to a filling operation or rejected from the line. The bottles in which hydrocarbons were detected were rejected from the line.

While the invention has been described with reference to the use of a separate power gas, for example, air, to operate the sampling valve, it is within the scope of the invention to use a single gas source, i.e., the carrier gas, to supply the power for activation of the sampling valve. To this end lines 20 and 27 would be connected. The use of an inert carrier gas as the power gas would be advantageous when sampling gas streams with low component concentration. The carrier gas would not affect the sensitivity of the results since it is inert. Air, on the other hand, contains gases which would have a tendency to pass through diaphragm 76 and contaminate the sample.

Reasonable variation and modification are possible within the scope of the foregoing disclosure, the drawings, and the claims to the invention without departing from the spirit thereof.

I claim:

1. In a two-position, fluid-actuated, diaphragm-sealed, valve sampling system comprising, in combination: a first body having two opposite faces; first, second, third, fourth, fifth and sixth spaced passages in said body, each of said first, second, fifth and sixth spaced passages communicating between said faces, a closed sample loop comprising said third spaced passage extending at least a portion of the distance between said faces from the lower face of said first body connected to said fourth spaced passage extending at least a portion of the distance between said faces from the lower face of said first body, a second body having an upper face spaced from the lower face of said first body; a first flexible sealing diaphragm of a diameter at least sufficient to cover said spaced passages; first, second, third, fourth, fifth and sixth cylindrical recesses in said upper face, opposite the ports between said first through sixth spaced passages, respectively; first, second, third, fourth, fifth and sixth cylindrical passages traversing said second body within the circle described by said cylindrical recesses; first, second, third, fourth, fifth and sixth plunger rods slidably disposed in said first through sixth cylindrical passages, respectively; the upper ends of said rods adjacent said diaphragm and intermediate the ports of said first through sixth spaced passages, so that said first rod seals against said diaphragm intermediate the ports of said first and second spaced passages, so that said second rod seals against said diaphragm intermediate the ports of said second and third spaced passages, so that said third rod seals against said diaphragm intermediate the said third and fourth spaced passages, so that said fourth rod seals against said diaphragm intermediate said fourth and fifth spaced passages, so that said fifth rod seals against said diaphragm intermediate said fifth and sixth spaced passages, and so that said sixth rod seals against said diaphragm intermediate said sixth and first spaced passages; a first power piston disposed adjacent and below said second body and normally biased out of contact with said first, third, and fifth rods; a first chamber defined by the lower face of said second body and the upper face of said first power piston; first biasing means disposed in said first chamber normally biasing said first piston downwardly; second power piston disposed adjacent and below said first power piston and normally biased in contact with said second, fourth and sixth plunger rods; a third body disposed adjacent and below said second piston and normally spaced therefrom; a second chamber defined at its upper end by the lower face of said first power piston and at its lower end by the upper face of said second power piston; a third chamber defined at its upper end by the lower face of said second power piston and at its lower end by said third body; a cylindrical casing, the inner surface of which makes sealing contact with the peripheries of said power pistons, the upper edge of said casing making sealing contact with second body and the lower edge of said casing making sealing contact with said third body; a second and stronger biasing means disposed intermediate said second power piston and said third body normally biasing the former upwardly; means to secure said first, second and third bodies and said power pistons adjacent to one another in a fixed relationship; a carrier gas supply; a first conduit means for conducting carrier gas to said first spaced passage; a sample source; a second conduit means for conducting fluid sample to said second spaced passage; a third conduit means for venting sample gas from said fifth spaced passage, and a fourth conduit means for conducting said carrier gas and sample from the sixth of said spaced passages to a detecting means; a power gas source; fifth conduit means for conducting power gas therefrom to said second chamber to exert pressure on said power pistons during a first time interval; said power gas first overcoming said first biasing means and exerting force on said first, third and fifth plunger rods, contacting the upper side of said first power piston, to force first, third and fifth portion of said sealing diaphragm adjacent thereto to seal between alternate pairs of ports of said spaced passages of said first body; said power gas simultaneously exerting increasing downward pressure on said power piston, overcoming said second biasing means, thus retracting said second piston means, permitting said second, fourth and sixth plunger rods to break sealing contact with second, fourth and sixth portions of said sealing diaphragm adjacent thereto, thereby establishing communication between the alternate pair of ports of said spaced passages, whereby carrier gas enters said valve through said first spaced passage, passes through said sample loop, driving before it a slug of sample fluid trapped therein and out of said valve via said fourth spaced passage while sample fluid enters said valve via said second spaced passage and directly exits via said third spaced passage; said first conduit means adapted to vent said second chamber during a second time interval, whereupon said power pistons revert to their first described positions, during which carrier gas will establish communication between the first alternate ports, while maintaining sealing communications between the other set of alternate ports, whereby carrier gas enters said system through said first spaced passage and directly exits said fourth spaced passage, while said sample fluid enters said second spaced passage, passes through said sample loop and exits via said third spaced passage; the improvement which comprises a fixed conduit means to connect said conduit means to said third chamber, so that when power gas is supplied to said second chamber, the expansion of said second chamber and the contraction of said third chamber exhaust gas from said sample loop through said second conduit means, and when power gas is released during said second time interval, the expansion of said third chamber draws said sample through said second conduit means into a sample loop.

2. A two-position, fluid-actuated, diaphragm-sealed, valve sampling system according to claim 1 wherein said first and third chambers are in communication.

3. A two-position, fluid-actuated, diaphragm-sealed, valve sampling system according to claim 1 wherein the volume of displacement due to expansion and contraction of said third chamber is greater than the sum of the volumes of said second conduit, said sample loop, and said third conduit.

4. A system for detecting the presence of deleterious gaseous materials in reusable bottles comprising the valve system of claim 1, a conveyor means for intermittently advancing a plurality of bottles, a positioning means for positioning said second conduit means in an intermittently moved bottle on said conveyor means; a means for actuating said power gas source to deliver power gas intermittently to said fifth conduit means so that when said second conduit means is within said bottle, power gas is exhausted from said fifth conduit means; a detector means communicating with said fourth conduit means for detecting the presence of deleterious gases; and a signal means connected to said detector to emit a signal responsive to the detection of deleterious gases within said sample.

5. In a two-position, fluid-actuated, diaphragm-sealed valve in which there is provided at least two pistons for actuating the sealing of ports for sample entry, sample exhaust, sample loop, and carrier gas entry and exhaust, a first conduit means for introducing sample into said valve, a second conduit means for exhausting sample from said valve, a third conduit means for supplying carrier gas to said valve, a fourth conduit means for removing carrier gas from said valve, a sample loop connected at one interval of time to said first conduit means and said second conduit means and connected at a second interval of time to said third conduit means and said fourth conduit means, a first piston chamber defined by a first and second piston, a second piston chamber defined by the valve body and by said second piston, means to supply power gas to said first piston chamber, the improvement which comprises means for connecting said second conduit means to said second piston chamber, the volume of said second piston chamber being greater than the volume of said sample loop and said first conduit means to thereby pump sample into said sample loop by the actuation of said second piston.

References Cited

UNITED STATES PATENTS

| | | | |
|---|---|---|---|
| 3,000,218 | 9/1961 | Marks et al. | 73—422 |
| 3,140,615 | 7/1964 | Broerman | 73—422 |
| 3,368,385 | 2/1968 | Harvey | 73—23.1 |
| 3,321,954 | 5/1967 | Bailey | 73—23 |

RICHARD C. QUEISSER, *Primary Examiner.*

VICTOR J. TOTH, *Assistant Examiner.*

U.S. Cl. X.R.

73—422

UNITED STATES PATENT OFFICE
CERTIFICATE OF CORRECTION

Patent No. 3,417,605                            December 24, 1968

William C. Hahn

It is certified that error appears in the above identified patent and that said Letters Patent are hereby corrected as shown below:

Column 7, line 70, "second" should read -- said second --. Column 8, line 43, before "conduit", second occurrence, insert -- third --.

Signed and sealed this 7th day of April 1970.

(SEAL)
Attest:

Edward M. Fletcher, Jr.

Attesting Officer

WILLIAM E. SCHUYLER, JR.

Commissioner of Patents